US006453038B1

(12) United States Patent
McFarlane et al.

(10) Patent No.: US 6,453,038 B1
(45) Date of Patent: Sep. 17, 2002

(54) SYSTEM FOR INTEGRATING AGENT DATABASE ACCESS SKILLS IN CALL CENTER AGENT ASSIGNMENT APPLICATIONS

(75) Inventors: Keith R. McFarlane, Denver; Andrew Derek Flockhart, Thornton; Lucinda M. Sanders; Paul L. Richman, both of Boulder; Darryl J. Maxwell, Lafayette, all of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 112 days.

(21) Appl. No.: 09/586,168

(22) Filed: Jun. 1, 2000

Related U.S. Application Data

(63) Continuation of application No. 09/089,788, filed on Jun. 3, 1998, now Pat. No. 6,233,332.

(51) Int. Cl.[7] .............................. H04M 3/00; H04M 5/00
(52) U.S. Cl. .............................. 379/265.05; 379/266.05
(58) Field of Search ........................ 379/265.01–265.14, 379/266.01–266.1, 309, 242, 201.01–201.12, 207.01–207.16

(56) References Cited

U.S. PATENT DOCUMENTS

| 5,206,903 A | * | 4/1993 | Kohler et al. ............... 379/309 |
| 5,675,637 A | * | 10/1997 | Szlam et al. ............ 379/114.19 |
| 5,721,770 A | * | 2/1998 | Kohler ....................... 379/266 |
| 5,740,238 A | * | 4/1998 | Flockhart et al. ........... 379/221 |
| 5,754,639 A | * | 5/1998 | Flockhart et al. ........... 379/221 |
| 5,825,869 A | * | 10/1998 | Brooks et al. ............... 379/265 |
| 6,046,762 A | * | 4/2000 | Sonesh et al. ................ 348/16 |
| 6,047,060 A | * | 4/2000 | Fedorov et al. ............. 379/265 |
| 6,058,435 A | * | 5/2000 | Sassin et al. ............... 709/305 |
| 6,097,806 A | * | 8/2000 | Baker et al. ................ 379/265 |
| 6,130,933 A | * | 10/2000 | Miloslavsky ............. 379/90.01 |
| 6,163,794 A | * | 12/2000 | Lange et al. ................ 709/202 |

* cited by examiner

Primary Examiner—Ahmad F. Matar
Assistant Examiner—Benny Q. Tieu
(74) Attorney, Agent, or Firm—Patton Boggs LLP

(57) ABSTRACT

The system for integrating agent database access skills in call center agent assignment applications dynamically generates data indicative of an agent's effective skill level by mapping the agent's acquired skills into their augmented skills representative of their ability to use the various automated resources that are required to satisfy the customer's request. The determined effective skill level is automatically updated as changes in the agent's effective skills are measured. In order to distribute work among the agents based upon agent skill levels, there must be a measure of each agent's competence with a particular skill. The pool of agents is divided into categories of those who must use guided problem solving tools to service a customer request, those who can address issues beyond the scope of the guided problem solving tool, and those who exhibit various levels of efficacy in using the guided problem solving tool. The system for integrating agent database access skills in call center agent assignment applications automatically computes an agent's effective skill level, which is a term used herein to describe a metric indicative of the agent's overall knowledge management ability consisting of both acquired skills and augmented skills.

15 Claims, 5 Drawing Sheets

FIG. 6

| AGENT EXPERIENCE LEVEL | KNOWLEDGE TOOL SKILL LEVEL | AUGMENTED SKILL IN TASK 1 | AUGMENTED SKILL IN TASK 2 | AUGMENTED SKILL IN TASK 3 |
|---|---|---|---|---|
| 0 | 0 | 0 | 0 | 0 |
| 0 | 1 | 0 | 0 | 0 |
| 0 | 2 | 1 | 1 | 0 |
| 0 | 3 | 2 | 2 | 1 |
| 0 | 4 | 2 | 2 | 1 |

| AGENT EXPERIENCE LEVEL | KNOWLEDGE TOOL SKILL LEVEL | AUGMENTED SKILL IN TASK 1 | AUGMENTED SKILL IN TASK 2 | AUGMENTED SKILL IN TASK 3 |
|---|---|---|---|---|
| 1 | 0 | 0 | 0 | 0 |
| 1 | 1 | 1 | 1 | 1 |
| 1 | 2 | 2 | 1 | 1 |
| 1 | 3 | 2 | 2 | 1 |
| 1 | 4 | 3 | 2 | 2 |

SYSTEM FOR INTEGRATING AGENT DATABASE ACCESS SKILLS IN CALL CENTER AGENT ASSIGNMENT APPLICATIONS

CROSS-REFERENCE TO RELATED APPLICATIONS

This application is a continuation in part of U.S. patent application Ser. No: 09/089,788 filed on Jun. 3, 1998 now U.S. Pat. No. 6,233,332 and titled "System for Context Based Media Independent Communications Processing" and is related to an application titled "System for Automatically Assigning Skill Levels to Multiple Skilled Agents in Call Center Agent Assignment Applications," which is filed on the same date as the present application.

FIELD OF THE INVENTION

This invention relates to call processing systems and, in particular, to a call center call routing process that utilizes: the identity of the calling party, the call context as well as a measurement of the effective agent skill level, comprising both the acquired and augmented skills of the various agents who staff the call center, to route the call to a destination call center agent in a manner that is appropriate to the contact, with the agent skill level being automatically updated on a dynamic basis.

Problem

It is a problem in customer service scenarios, such as a call center, that these systems are architected in a manner to minimize the cost of providing the offered services pursuant to some predefined level of responsiveness to customers' requests. The call center systems typically provide a pool of customer service representatives, termed "agents" herein, who have various skill levels, to provide the calling party with an appropriate response to their inquiry. The agents are managed by a call center administrator who manually generates metrics representative of various agent performance factors, including but not limited to: speed of processing the request, competence in providing the calling party with appropriate data, knowledge of the subject matter, and the like. Call center call routing systems use these metrics to interconnect a calling party with an agent who is determined to have the skills to most efficiently process the contact. The definition of these metrics and the efficiency measure are highly subjective and typically fail to recognize many other factors that are relevant to the processing of an incoming contact.

An incoming contact to a call center is traditionally processed through hunt groups to a selected one of a plurality of splits, each of which comprises a plurality of hard wired telephones wired into a queue. An improvement over this hard wired call distribution system comprises a universal work queue for agents, which enables the call center system administrator to adjust the assignment of the incoming call connections for each agent or group of agents while also monitoring call center statistics. Also, the agents who staff the call center are not dedicated to processing only a single type of contact, but can receive incoming calls of varying types, as their determined skill permits. The various agents and automated information sources available to the call center customer are dynamically incorporated into the communication connection on an as needed basis in order to serve the needs of the calling party.

In particular, the call center can be equipped with one or more automated resources that assist the agent in performing their assigned task. These automated resources are characterized by many different terms such as: automated knowledge access tools, knowledge management, knowledge base, guided problem solving tools, databases, expert systems, interactive diagnostic tools, and the like, which automated resources enable the agent to more efficiently analyze the calling party request and obtain closure with regard to providing the information and/or service necessary to satisfy the calling party, which actions are termed "fulfillment" herein. The use of automated resources adds another dimension to the entire agent management process, since some agents have acquired their skills via experience and may not be adept at the use of the automated resources, while other agents are expert in their use of the automated resources while they do not have extensive experience in the topic area. Thus, the determination of the effective agent skill is a combination of the agent's acquired skills, based upon actual experience, and the agent's ability to use the each of the various automated resources that are part of the call center system, termed "augmented skill" herein. Existing call centers do not account for this additional dimension of agent management relating to augmented skills and the present systems use a simple multiple level skill assignment paradigm to differentiate only the agents' acquired skills in performing their assigned tasks.

A further problem is that the assignment of the multiple skill levels is traditionally performed manually by the call center administrator capturing the agent's skill level in various subject areas by monitoring the agent's performance and then applying this information to call routing decisions. Unfortunately, the supervisor or call auditor must expend a significant amount of time in monitoring the agents and determining their competence using some set of quantifiable measurements. The resultant determined skill level is valid for only as long as the agent has not progressed to a successive level of competence in the skill sets. Thus, the measurement process must be ongoing and can require a significant administrative overhead. The absence of an automated skill level assignment system further complicates the presence of the automated resources in the call center environment.

In summary, existing call centers, equipped with automated resources which are used to serve the customers who access the call center, do not have the capability to recognize the effectiveness of the agents in their ability to use the automated resources or the ability to automatically determine and assess the skill level of the agents. This inability to effectively assess and/or automatically assign represent resource management problems that translate to additional expenses for the call center operator due to misallocation of agent resources to the incoming calls received at the call center.

Solution

The above described problems are solved and a technical advance achieved by the present system for integrating agent database access skills in call center agent assignment applications, which dynamically generates data indicative of an agent's effective skill level by mapping the agent's acquired skills into their augmented skills representative of their ability to use the various automated resources that are required to satisfy the customer's request. The determined effective skill level is automatically updated as changes in the agent's effective skills are measured and used by an intelligent work distribution system to make most effective use of the agents and their available skills.

In particular, in order to distribute work among the agents based upon agent skill levels, there must be a measure of each agent's competence with a particular skill. This is presently done with acquired skills, but not with augmented skills. The use of automated automated resources in a call center environment is beneficial to the operator of the call center in that it reduces the cost of training customer agents and improves the overall effectiveness of the customer service agents. Thus, the pool of agents can be divided into categories of those who must use the guided problem solving tool to service a customer request, those who can address issues beyond the scope of the guided problem solving tool, and those who exhibit various levels of efficacy in using the guided problem solving tool. The granularity applied to each of these categories is a function of how the metric can be quantified and the need to have a predetermined number of skill levels to differentiate among the agents. The system for integrating agent database access skills in call center agent assignment applications automatically computes an agent's effective skill level, which is a term used herein to describe a metric indicative of the agent's overall knowledge management competence consisting of both acquired skills and augmented skills.

The present system weights an agent's acquired skill level for a particular task by use of a weighting factor that is a measure of the agent's augmented skill level consisting of the agent's ability to use a guided problem solving tool. For example, the agent skill level associated with the use of a particular automated resource can be mapped to an effective skill level in a particular subject matter. The system automatically reevaluates and reassigns the skill levels for the agents with regard to the fulfillment process. There are numerous techniques that can be used to automatically update agent skill levels, including but not limited to:

Establishing a set of measurable per-transaction goals (sale made, contact handled within a predetermined time, customer satisfaction) for each interaction type of transaction (sales contact, trouble contact, emergency contact). If these goals are consistently met, the agent's skill level is automatically incremented by a predefined amount.

Aggregating goal types over time such that the agent's performance overtime is considered, with the agent performance representing consistency, as well as performance growth.

Reporting skill changes recorded in an external source and/or automatically generating alerts with respect to automatically identified changes in agent skills.

Thus, the present system for integrating agent database access skills in call center agent assignment applications dynamically generates data indicative of an agent's effective skill level by mapping the agent's experience skills into their ability to use the various automated resources that are required to satisfy the customer's request. The determined effective skill level is automatically updated as changes in the agent's effective skills are measured and used by an intelligent work distribution system to make most effective use of the agents and their available skills.

BRIEF DESCRIPTION OF THE DRAWING

FIG. 6 illustrates in tabular form the typical data structure used in the system for integrating agent database access skills in call center agent assignment applications for managing effective agent skill assignments.

DETAILED DESCRIPTION

Figure 1:
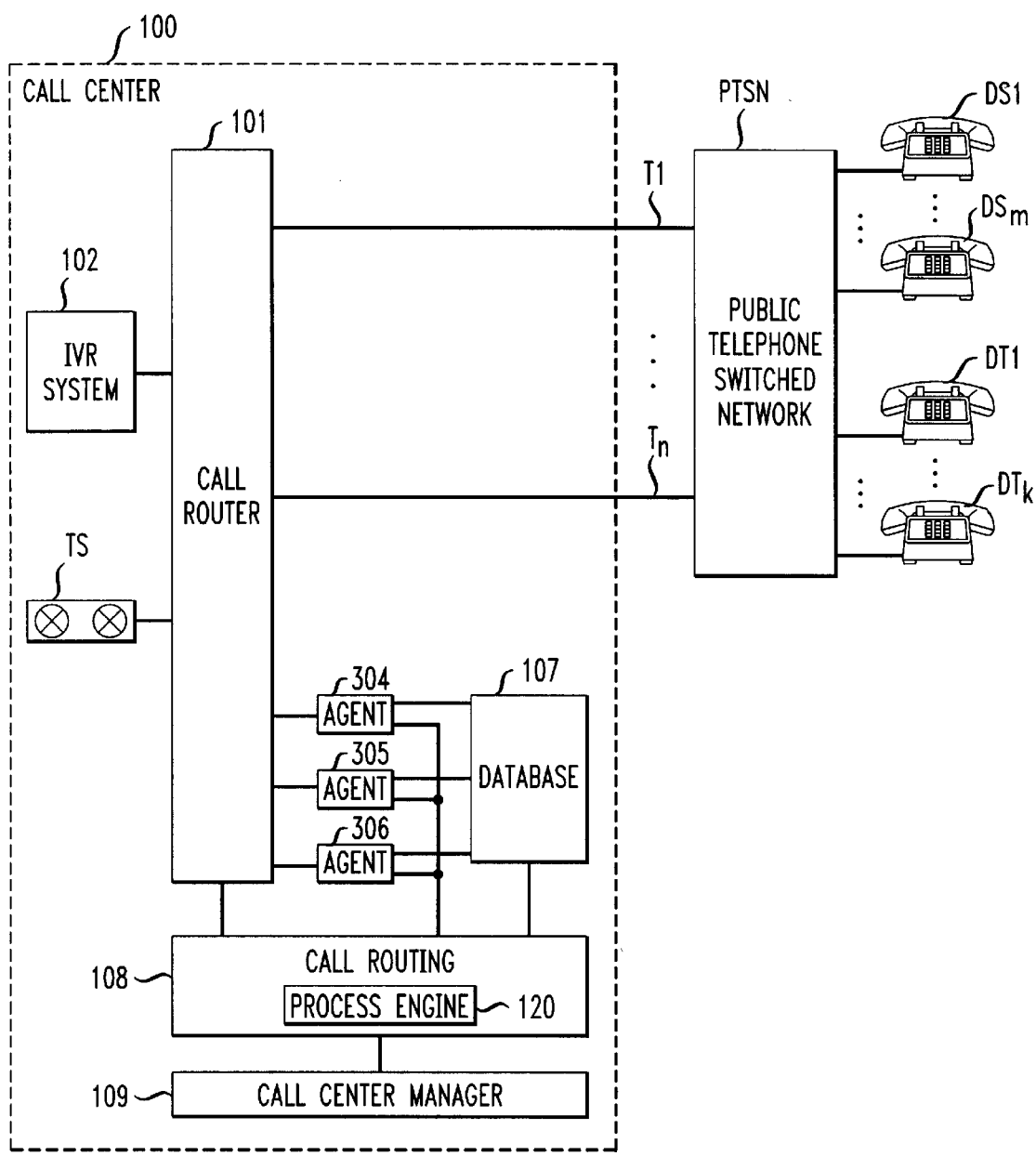
FIG. 1 illustrates in block diagram form the preferred embodiment of a call center architecture which incorporates the system for integrating agent database access skills in call center agent assignment applications.

The system for integrating agent database access skills in call center agent assignment applications dynamically generates data indicative of an agent's effective skill level by mapping the agent's acquired skills into their augmented skills representative of their ability to use the various automated resources that are required to satisfy the customer's request. The determined effective skill level is automatically updated as changes in the agent's effective skills are measured and used by an intelligent work distribution system to make most effective use of the agents and their available skills. In order to simplify this description, the following description in voice-centric, although it is evident that contacts with the call center can be made via other media, including the Internet, private networks, cellular communication systems, and the like.

The call center processing of an incoming contact to completion can be divided into three identifiable functions. The first function represents the segmentation phase where the call center identifies customers and determines a quality of service to be provided to this customer. The customer identity is typically determined via Automatic Number Identification data received from the central office that serves the calling party and/or the use of an Interactive Voice Response system to collect data from the calling party. The call center may also use the customer identity to compute a customer lifetime value, which is an indication of the value of this customer to the operator of the call center. The second function comprises resource selection, wherein the call center selects an agent from the pool of agents, using data from any of a number of sources to identify the service needed by the calling party, such as data indicative of the dialed number (where the call center maintains a plurality of listed directory numbers for the each of the various services provided), data from the Interactive Voice Response system indicative of a calling party selection of a desired destination or desired service, and/or data from databases maintained in the call center indicative of the calling party's previous interactions with the call center, which data can be used to extrapolate the calling party's history to predict the service presently required. The identified service request is mapped to a selected agent in the pool of agents as a function of agent skill level, agent availability, customer value, and various other factors. Finally, the third function comprises a fulfillment phase wherein the calling party is connected with a selected agent who performs requested function, using the agent's acquired and/or augmented skills.

The execution of the final function includes the collection of data regarding the performance of the agent, which data is used to automatically update the agent's skill level. This data collection includes detecting trends in agent performance as well as the extrapolation of detected trends.

In order to provide a context for the present system for integrating agent database access skills in call center agent assignment applications, the call center disclosed in the above-noted patent application titled "System for Context Based Media Independent Communications Processing" is used as an example of a call center. However, the use of this call center system is not intended to limit the applicability of the present system for integrating agent database access skills in call center agent assignment applications to other call centers and other communication systems, since the applicability of the concepts disclosed herein are not limited to the particular application disclosed herein.

Call Center Function and Architecture

FIG. 1 illustrates in block diagram form the preferred embodiment of a call center architecture which includes the system for integrating agent database access skills in call center agent assignment applications. A call center 100 comprises an automated call management system where customers can access information regarding products and services that are offered by the call center operator. The call center 100 is generally staffed by a number of agents 304–306 who answer queries from the customers, provide information, and take customer orders, as well as optional recorded information sources TS, and the like. The call center 100 is connected to a plurality of lines T1–Tn of the Public Telephone Switched Network PTSN, which serves to interconnect a plurality of subscribers to each other and to the call center 100. The subscribers can be equipped with rotary dial telephones DS1–DSm, or touch-tone telephones DT1–DTk. The call center 100 includes a call routing controller 108 that is equipped with an intelligent work distribution system, termed a "process engine 120" herein, to manage the call assignment to agents as described below. In addition, the call center 100 includes a call center manager 109 that functions to regulate the agent skill assignment and overall operation of the call center 100, such as assignment of thresholds, setting of call management parameters, setting of agent monitoring statistics, and the like.

The call center 100 can optionally include or be served by an Interactive Voice Response system 102 that functions in well known fashion to collect data from the calling party to enable the call center 100 to direct the incoming contact to an appropriate destination within the call center 100. By using the automated interactive voice response system 102, the call center system 100 avoids the need to provide human operators to perform the particular data gathering function that is provided by the interactive voice response system 102. This enables the provision of the features and services to be effected in an inexpensive and efficient manner.

Architectural Layers of the Call Center

Figure 2:
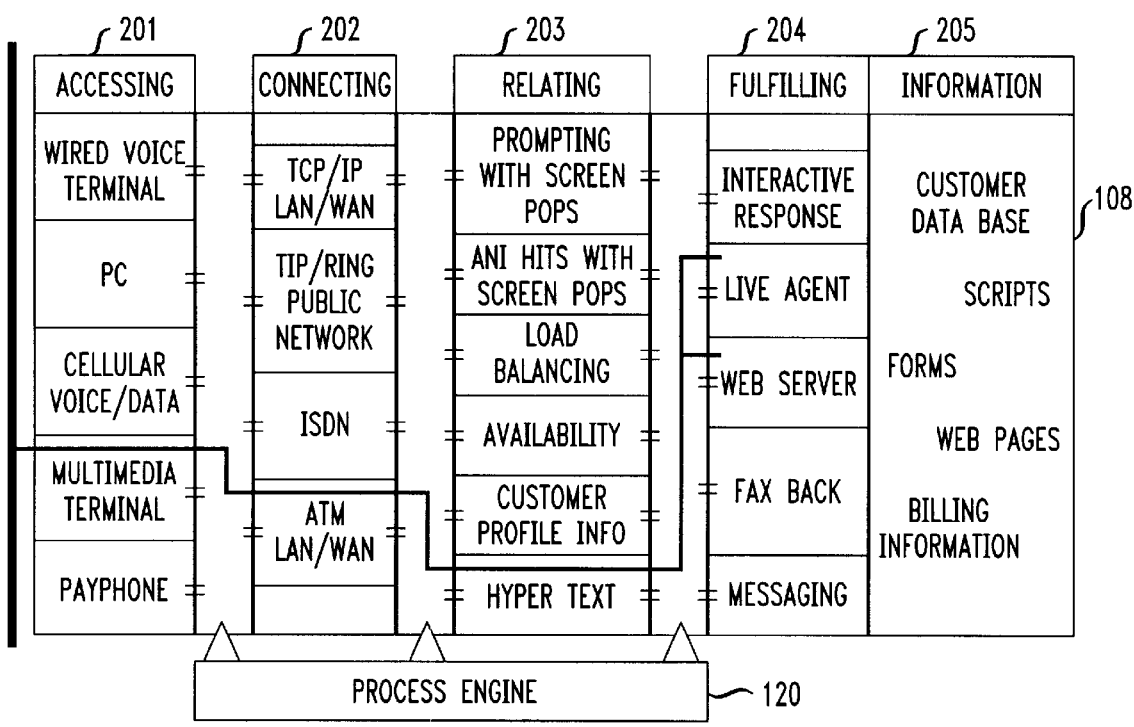
FIG. 2 illustrates in block diagram form the preferred embodiment of a call center architecture that uses a work flow-based call management paradigm.

FIG. 2 illustrates in block diagram form the preferred embodiment of a call center call routing controller 108 that uses a work router, such as a rules-based call management paradigm to obtain data from and control the operation of the various communication facilities that serve to implement the call connections. As described in the above-noted patent application titled "System for Context Based Media Independent Communications Processing," calls can be placed to the call center 100 with more than one medium and media can be added to or dropped from the communication connection at any time during a contact. The call center 100 functions to selectively interconnect the plurality of customers with the information and services that are provided by the call center 100. To accomplish this function, the incoming call from a customer must be routed in an appropriate and efficient manner through the call center architecture. The rules-based call routing processor 108 operates a process engine 120 to enable the customer to provide data, either actively or passively, to define the optimal route through the call center 100 to obtain the services desired by this customer in a customer-specific manner. The work flow-based call routing process 108 collects data from the various elements used to implement the call center and also provides data to regulate the operation of the call center elements by use of the process engine 120.

To effect a communication connection to the call center 100, the customer must initiate a call connection in a conventional manner to a point of presence provided by the call center 100 on the appropriate communication network. In this example, the call center 100 has a plurality of such point of presence embodiments to thereby serve customers with diverse types of communication devices. These are: Terminal Control Protocol/IP (TCP/IP) on an Local Area Network/Wide Area Network (LAN/WAN), Public Telephone Switched Network (PTSN), Integrated Services Digital Network (ISDN), and Asynchronous Transfer Mode (ATM) on an LAN/WAN.

The Accessing Layer 201 comprises a categorization of a plurality of communication devices that the customer may use to initiate a call connection. Those listed in FIG. 2 are typical examples of communication devices and the various entries listed herein can be divided into different combinations than that illustrated herein, depending on the granularity of the divisions that may be desired for a particular application. The entries illustrated are: wired voice terminal, personal computer, cellular voice/data, anymedia terminal, pay phone. Each of these categories represents a subset of well known communication devices and an associated technology that must be served by the call center 100. For the purpose of illustration, the following example uses a customer who is equipped with a anymedia terminal and who desires to access information, resident in the communication and data processing systems that serve the call center 100. As shown in FIG. 2, the customer at the anymedia terminal traverses the first hallway to enter the "room" noted as ATM, which indicates that the customer call connection is implemented from a anymedia terminal via the physical communication facilities implemented in the Asynchronous Transfer Mode of data communication.

The third layer of the hierarchy comprises the Relating Layer 203 which represents the mode of presenting the point of presence to the customer (and possibly also to the agent) once the customer reaches the physical boundary of the call center 100. These selections are: prompting the user with screen pops, ANI hits with screen pops, hypertext, voice message with user prompts, recorded message, and the like. Each of these call center responses are appropriate for a particular customer communication device and/or communication mode, or are based on a customer preference. Therefore, the work flow-based call routing process 108 must collect data from the incoming call connection to determine the particulars of this incoming contact to thereby provide an appropriate response. If the incoming call data includes an identification of the customer, the work flow-based call routing process 108 can access the data stored in one of the databases 107 resident in the call center 100 to retrieve customer-specific data to enhance the appropriateness of the call handling, as is described in additional detail below.

The fourth layer of the hierarchy comprises the Fulfilling Layer 204 which represents the physical apparatus and business process used by the call center to serve the call connection. These include: interactive response, live agent, Web server, FAX back, voice message. The rules-based call routing process directs the incoming contact, absent specific selections by the customer, to an appropriate one of these options to thereby create a pseudo personal connection, where the customer has their incoming contact processed in a manner that is of greatest interest to this particular customer. This personalization includes the use of call context information, so the serving agent can provide a personalized response, having had access to the context of this particular customer displayed at the time the incoming contact is connected to the agent's terminal.

The final layer of the hierarchy comprises the Information Layer 205 that comprises the associated information processing systems that function to provide the goods and services to the customer. These include: customer database, communication context database, order entry scripts, forms, Web pages, customer billing information, back office fulfilment, contact context data input by the agents in response to contact context changes occasioned by the customer, and the like. These databases are typically resident in a plurality of independently operational data processors.

Process Engine and Rules Data

Figure 3:
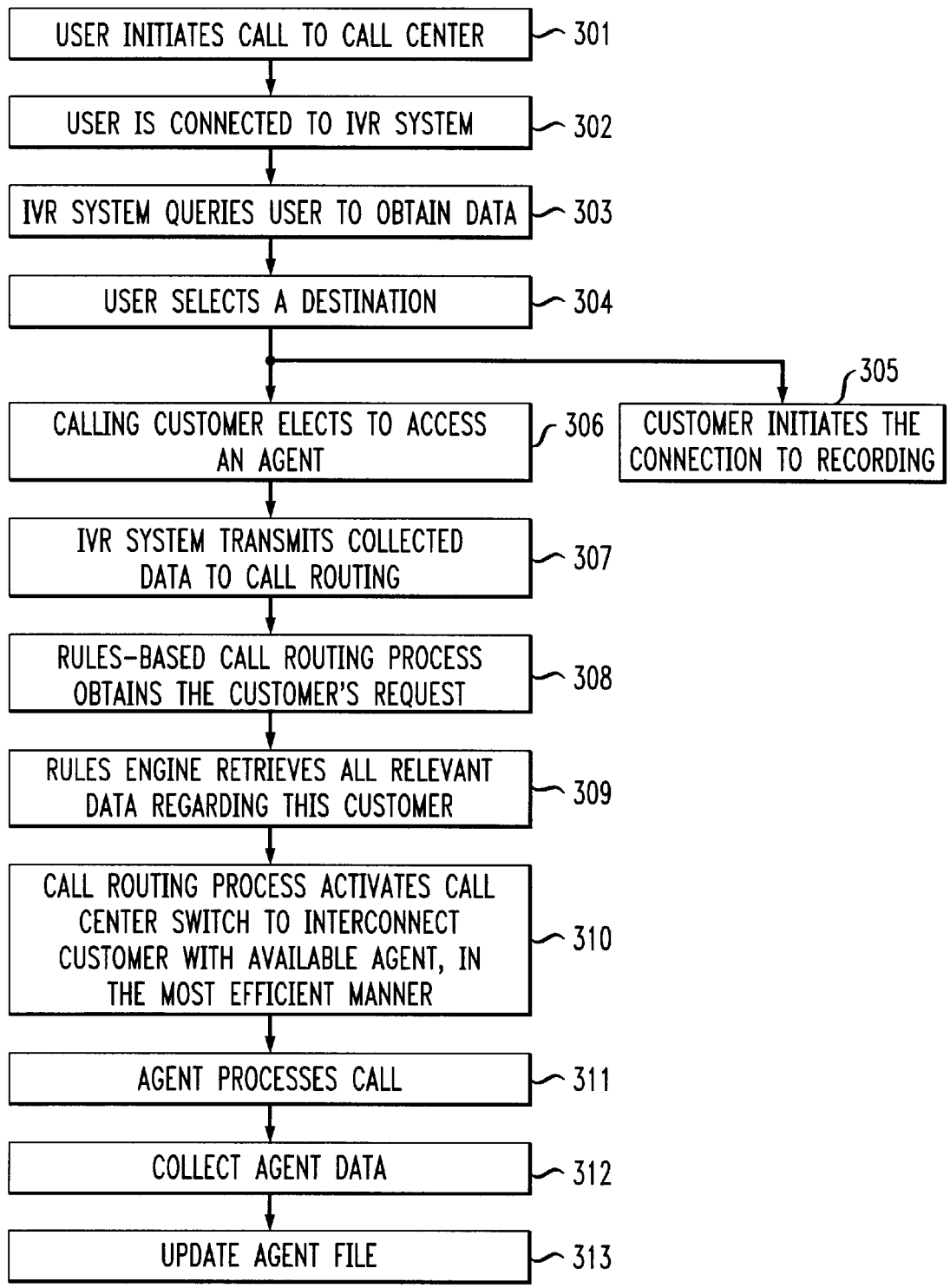
FIG. 3 illustrates in flow diagram form the operation of the call center of FIG. 1 in the processing of a typical call connection, using the system for integrating agent database access skills in call center agent assignment applications.
Figure 4:
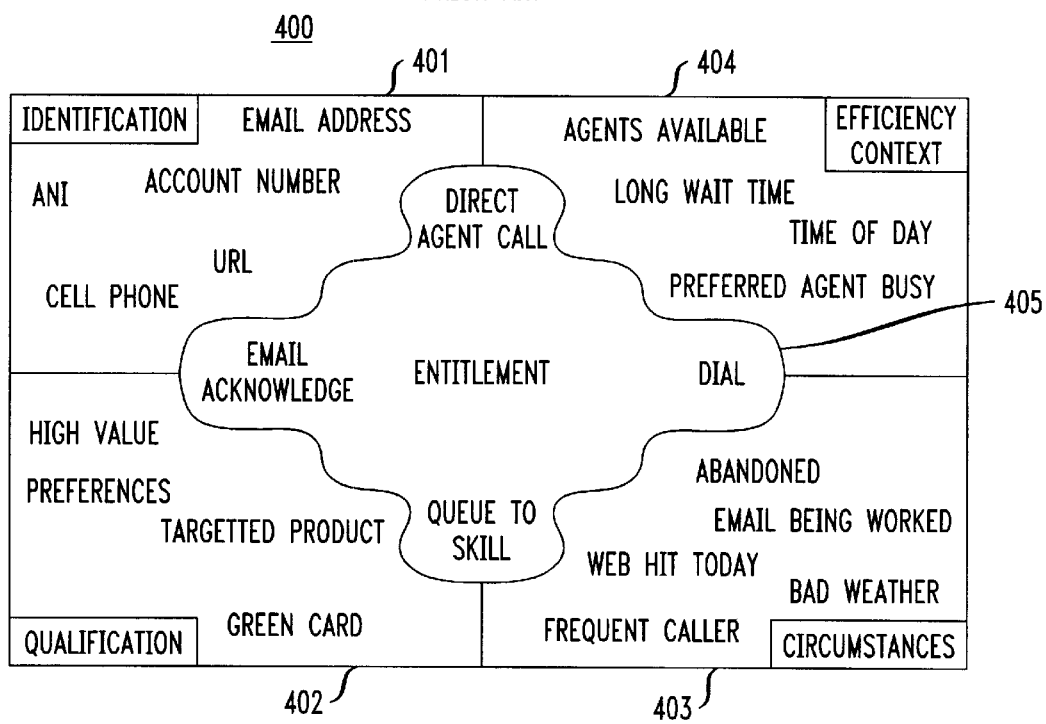
FIGS. 4 and 5 illustrate in block diagram form the architecture of the process engine data and the process engine, respectively, for the call center example of FIG. 1 in the processing of a typical call connection.
Figure 5:
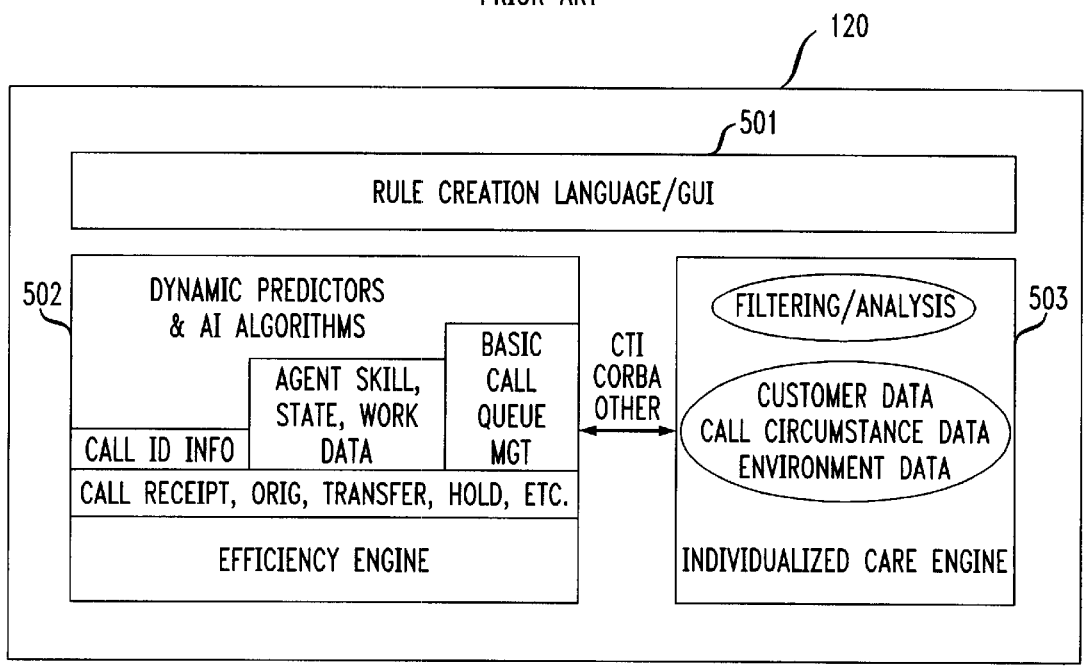

FIGS. 4 and 5 illustrate in block diagram form the architecture of the process engine data 400 and the process engine 120, respectively, for the call center example of FIG. 3 in the processing of a typical call connection. In FIG. 4, the data 400 typically contained in the process engine 120 is divided into a number of categories. The first category is the Identification Data 401 that can be used to assist in the identification of the calling customer. This data represents the information that is available as a result of the calling customer creating a physical call connection to the call center system 100 via some selected communication medium, and is contained in the call context. This data can be caller identification if the calling customer is using a voice line connection from a telephone station set TEL1, TEL2, or E-Mail address if accessing the system via a personal computer 300 and a shared communication network such as an Intranet or the Internet. The second category of rules data comprises the Qualification Data 402 that identifies the importance of this calling customer to the operator of the call center 100. Thus, the customer identification data is used to access account information contained in the database 107 to provide further information that relates to the specific needs of this calling customer. Therefore, the calling customer can be identified as a "high value" customer based upon past volume of sales transactions and may also be identified as the recipient of special discount offers. The third category of rules data comprises Circumstances Data 403 that may impact on the processing of this call connection. Thus, the prior contact activity for this calling customer may be an important indicator of the type of service that they should receive. The fourth category of rules data comprises the Efficiency Context Data 404 for the call center 100. This data relates to the present state of operation of the call center and provides an indication of length of queue, status of preferred agents which agent would be best adapted to process this contact, and the like. Finally, the fifth category of rules data comprises the Entitlement Data 405 that defines the type of call processing that is appropriate or preferred for this specific calling customer. Thus, the calling customer may prefer personalized service from an agent rather than a voice response system, or the calling customer may prefer immediate service. In addition, an any media call instance can be processed where for example the customer initiates a voice call and desires an E-Mail response order confirmation. These categories of rules data are maintained in the process engine 120 to enable the system to efficiently process the calling customer's call connection.

The process engine 120 itself is illustrated in block diagram form in FIG. 5 and, for the particular call center example, comprises three components. The rules creation language 501 comprises a user interface that enables a system administrator to create and manage the rules that are used to regulate the operation of the process engine 120 and thereby regulate the operation of the call center 100. The individualized care engine 503 comprises customer-specific data and the processing of this data to adapt the operation of the call center 100 to most effectively match the preferences of a calling customer. Thus data represents a history of past interactions of the particular customer with the call center 300 as well as accounting data and data collected from other sources that is relevant to the provision of the degree of personalized service to the particular customer. The efficiency engine 502 comprises the call center operation control. This efficiency engine 502 maintains data relating to various aspects of operation of the equipment that comprise the call center 100. Thus, the example illustrated in FIG. 5 shows data collection for caller identification, as well as call status: new call received, call transferred, call on hold, and the like. Furthermore, agent data is maintained: identification of the skill set for each agent, the state of each agent position, and level of activity for each agent. There is also a basic call queue management process that provides a universal queue for incoming call connections. This queue identifies the time-ordered sequence of incoming call connections, regardless of the media that is used to serve the call connection. Thus, the calling customer is served in true order of arrival fashion (or any other queuing algorithm desired), rather than being placed in a queue based upon media type. The call center administrator can adjust the call distribution as a function of the number of calls in the queue of a particular media type. It is envisioned that at least some of the agents are equipped with terminals that enable the agents to process call connections of more than a single media type. The mix of media types processed by a particular agent can therefore be adjusted as a function of the mix of call connections in the universal queue. Finally, the efficiency engine 502 is equipped with a set of dynamic predictors and artificial intelligence algorithms to process all of the above-mentioned data to regulate the handling of the call connections.

Interactive Voice Response System

In order to limit the expense involved in providing operators, many customer service systems optionally include an Interactive Voice Response (IVR) system 102 front end that serves to interface with the calling party at telephone station set DS1, provide prompts to the calling party to enable the calling party to provide the interactive voice response system 102 with sufficient customer information to enable the call center 100 direct the call in an appropriate and efficient manner. In particular, the interactive voice response system 102 typically comprises a hierarchically ordered series of audio messages, each of which comprises a listing of the various choices available to the calling party at that particular juncture of the hierarchy. In response to presentation of these choices, the calling party typically elects to traverse another level of the hierarchy by selecting one of the options that were offered by the particular audio segment that was most recently presented to the calling party. The calling party presents their selection by operating a touch tone key on the telephone station set DS1 to thereby indicate the one of the plurality of choices that were offered. The interactive voice response system 102 monitors the communication connection for the presence of touch tone signals that are indicative of a calling party selection of one of the menu options that is presently being offered. In response to receipt of a touch tone signal, the interactive voice response system 102 traverses the hierarchy to the particular selection that was indicated by the presented touch tone signal. In this manner, the interactive voice response system 102 enables the calling party to traverse a plurality of hierarchically organized choices to reach a particular service or feature that is of interest to the calling party, without the call center having to expend any agent resources.

Call Routing via Rules Based Process

FIG. 3 illustrates in flow diagram form the operation of the call center of FIG. 1 in the processing of a typical call connection, using the system for integrating agent database access skills in call center agent assignment applications. The user initiates the call connection at step 301 from a telephone station set DS1 by dialing a listed directory number assigned to the call center 100. The Public Telephone Switched Network PTSN connects the user to the call center 100, which activates the process engine 120 to determine an appropriate routing of this incoming call. Since all media types are accepted, the process engine determines the nature of the data content and format in the incoming call: E-Mail, voice, WEB connection, Interactive textual data, facsimilie transmission, and the like. The process engine 120 reviews the status of the available resources, including: human agents, Voice Response Unit ports, facsimilie machines, servers, automated agents, and the like. In this call instance, the process engine 120 extends the call connection to the Interactive Voice Response system 102 at step 302. The Interactive Voice Response system 102 at step 303 queries the user to collect data relating to the identity of the calling party and any other calling party related data that can be used to process this contact in the proper context. The Interactive Voice Response system 102 at step 304 receives indication from the user as to the desired destination. The calling party can elect to access a number of destinations, such as recorded announcements TS at step 305, or an agent at step 306. For the purpose of this description, the latter choice is described.

The processing of the initial connection for this calling customer comprises the call connection entering the Accessing Layer 201 of FIG. 2 via the Wired Voice Terminal category and receiving a point of presence on the call center system 100 by the process engine 120 providing a Tip/Ring Public Network section of the Connecting Layer 202 of FIG. 2. The process engine 120 performs a relationship building function, which comprises a layer of functionality that is overlaid on the connectivity layer. In the relationship building function, the mode of communication that is deemed appropriate by the process engine 120 for this type of access is the Availability category of the Relating Layer 203, which interconnects the Live Agent component of the Fulfilling layer 203 with the calling customer.

At step 307, the Interactive Voice Response system 102 transmits the collected data to the call routing process 108 for inclusion in the rules data 500 portion of the process engine 120. The call center router 101 communicates with the work flow-based call routing process 108 to direct this communication connection to an appropriate destination. The process engine 120 portion of the work flow-based call routing process 108 at step 308 obtains data relating to the customer (Information Layer 205) as part of the communication connection redirection. In particular, the identity of the customer, customer query information input to the by the customer, and the like are transmitted to the work flow-based call routing process 108. Thus, the call context data that is associated with this customer's access to the call center 100 is retained and passed along with the customer's communication connection to the next link in the call connection. The work flow-based call routing process 108 prequalifies this contact by generating a customer profile at step 309 and redirecting the communications connection to a selected category of the Fulfilling Layer 204 in the call center 100 based upon the customer-indicated preferences and passively collected customer data. For the selected example, the work flow-based call routing process 108 must route the calling customer to a live agent for the processing of this call connection.

Process Engine Processing of Incoming Call Data Accumulated Over Multiple Calls

Assume for the purposes of this description, that the calling customer has attempted to access the call center agents three times in the last 24 hour period and was unsuccessful in all three attempts due to the agents being busy. When the calling customer elects to access an agent at step, the work flow-based call routing process 108 as part of the call routing process, activates the process engine 120 which retrieves all relevant data regarding this customer for processing at step . The process engine 120 retrieves customer related data: Customer Data Base data from the Information Layer 205, Customer Profile Info category of the Relating Layer 203, as well as agent related data from the Load Balancing and Availability categories of the Relating Layer 203 in order to process the customer initiated request. The following data is relevant to this call connection:

Identification: Customer account number, telephone number, Internet address, and the like.

Circumstances: Customer has unsuccessfully attempted to reach an agent three times in a 24 hour period Qualification: Customer is of high value Efficiency Context: All agents are busy and incoming calls are queued The process engine is programmed with a plurality of rules relating to all aspects of call processing and data collection. An example of one such rule can be the following:

Rule: IF the calling customer is of high value and has abandoned their attempts to contact the call center agents via any medium at least three times in a single 24-hour period, THEN quickly connect the calling customer to an agent, EVEN if the call center is overloaded.

Therefore, once the process engine 120 receives the data relating to this calling customer's call connection, and history of prior attempts, the process engine 120 executes the above-noted rule and produces the following result:

Entitlement: Place this calling customer's call connection at top of queue for immediate processing.

The process engine 120 therefore signals the work flow-based call routing process 108 to place this call connection at the head of the incoming call queue and to route this call connection via call center switch 101 to the first agent whose skills match the needs of the calling party, such as agent 304. The agent availability, skill level and agent administration data is considered in the agent selection process for the servicing of this call connection.

The work flow-based call routing process 108 thus responds to this decision by activating call center switch 101 at step 310 to interconnect the calling customer with available agent 304. The agent 304 receives contact context data from the work flow-based call routing process 108 to thereby enable the agent 304 to interact with the calling customer in an informed manner. In particular, the customer-specific context data relating to this call connection is presented to the agent 304 as part of the initial call connection. The agent 304 can be informed of the calling customer's failed attempts, Web site browsing, presently shipped orders, back ordered goods, and the like. The agent 304 can thereby be prepared to intelligently discuss the customer's needs. Thus, at step 311 the agent 304 serves the calling customer's request.

Augmented Agent Skills

An agent at a computer company that sells and supports personal computers may receive a service call for support on a malfunctioning modem. Although the agent may not have a tremendous amount of experience with troubleshooting modem problems, a guided problem solving tool can provide the agent with a structured sequence of inquiries and tests to resolve the problem. After some time using the tool, the agent typically becomes more adept at not only providing answers to the questions addressed by the guided problem solving tool, but also answering questions that are beyond the scope of coverage of the guided problem solving tool. The first agent is a novice support person, while the latter is an adept or expert support person.

Using the range of skill levels from 0 representing no skill to 4 representing expert, the mappings of the table of FIG. 6 represents such a set of augmented skill determinations. The assignment of the multiple skill levels can be performed manually by the call center administrator capturing the agent's skill level in various subject areas and then applying this information to call routing decisions. Unfortunately, the supervisor must expend a significant amount of time in monitoring the agents and determining their competence using some set of quantifiable measurements. The resultant determined skill level is valid for only as long as the agent has not progressed to a successive level of competence in the skill sets. Thus, the measurement process must be ongoing and can require a significant administrative overhead. The system automatically reevaluates and reassigns the skill levels for the agents with regard to the fulfillment process. There are numerous techniques that can be used, including:

Establishing a set of measurable per-transaction goals (sale made, contact handled within a predetermined time, customer satisfaction) for each interaction type of transaction (sales contact, trouble contact, emergency contact). If these goals are consistently met, the agent's skill level is automatically incremented by a predefined amount.

Aggregating goal types over time such that the agent's performance overtime is considered, with the agent performance representing consistency, as well as performance growth.

Reporting skill changes recorded in an external source and/or automatically generating alerts with respect to automatically identified changes in agent skills.

The skill set defined for the agent comprises a plurality of skills, each of which is augmented by the availability of a automated resource or tools. The impact of the associated automated resource on the agent's skill to provide an augmented skill level varies as a function of the impact that the automated resource has on the agent's ability to be responsive to the calling party's needs. Therefore, in the chart of FIG. 6, an agent with a skill level of 0 and a automated resource skill level of 2 has their skill level for task 1 augmented to a 1 level, while for task 3, their skill level is not augmented at all. Similarly, an agent with a basic skill level of 1, and an associated automated resource skill level of 2, has their skill level for task 1 augmented to a 2 level, while for task 3, their skill level is augmented to a 2 level. Therefore, the augmentation of agent skills may not be linearly applied across tasks, nor across agent experience levels, nor across automated resource skill levels. The resultant multi-dimensional matrix of agent experience levels and automated resource skill levels mapped to augmented skill levels therefore represents the effective agent skill level for each set of input parameters.

In addition, multiple agent skills may be evaluated with respect to a particular contact. For example, upon receipt of an E-Mail comprising a consumer loan application, written in Spanish, the agent skills can be parsed into discrete categories: E-Mail proficiency, Spanish language proficiency, loan application processing proficiency. These proficiencies can be measured via supervisor monitoring of the agent, post contact processing accuracy measurements, time required by the agent to execute each task in the contact, and the like. This data can be collected automatically or manually and are processed by the procsee engine 120 to automatically update the agent skill levels.

Summary

The system for integrating agent database access skills in call center agent assignment applications dynamically generates data indicative of an agent's effective skill level by mapping the agent's acquired skills into their augmented skills representative of their ability to use the various automated resources that are required to satisfy the customer's request. The determined effective skill level is automatically updated as changes in the agent's effective skills are measured. In order to distribute work among the agents based upon agent skill levels, there must be a measure of each agent's competence with a particular skill.

What is claimed:

1. A communications management system, that is operational in a communication service providing system, for interconnecting a customer who is using a communication device, with a selected one of a plurality of agents who are connected to said communication service providing system, comprising:

at least one automated resource, operable to provide said plurality of agents with access to data to enable said selected one of said plurality of agents to serve said customer;

means for retrieving data relating to said customer to determine a service need of said customer;

means, responsive to said determined service need, for selecting a one of said plurality of agents to serve said customer, comprising:

means for maintaining data comprising a mapping of agent experience and agent ability to use, on an unassisted and unsupervised basis, said at least one automated resource to data indicative of an augmented agent skill level for said plurality of agents, means for automatically selecting said one agent as a function of an experience level of said agent with respect to said service need and said agent's augmented skill level in using a one of said at least one automated resource appropriate for said service need; and means for establishing a communication connection through said communication service providing system to said selected one of said plurality of agents who is capable of serving said customer.

2. The communications management system of claim 1 wherein said means for retrieving comprises:

interactive voice response means for presenting said customer with a predetermined hierarchically organized set of questions to obtain data from said customer for identifying said service need.

3. The communications management system of claim 1 wherein said means for retrieving comprises:

customer identification means for automatically obtaining data relating to said customer for identifying said service need.

4. The communications management system of claim 1 wherein said means for selecting comprises:

means for work flow based call routing using said identified service need to assist in the call navigation to said selected one of said plurality of agents.

5. The communications management system of claim 1 wherein said means for selecting comprises:

means for maintaining data comprising a mapping of agent experience, agent ability to use said at least one automated resource, and a plurality of classes of service needs to data indicative of an augmented agent skill level.

6. The communications management system of claim 5 wherein said means for rules based call routing further comprises:

means for maintaining data for use by said efficiency engine means and said customer satisfaction engine means.

7. The communications management system of claim 6 wherein said means for maintaining data comprises:

means for maintaining identification data comprising information that is available as a result of said communication connection;

means for maintaining qualification data comprising information that identifies the importance of said customer; and means for maintaining entitlement data comprising information that defines the type of call processing appropriate for said customer.

8. The communications management system of claim 1 wherein said means for selecting further comprises:

means for analyzing availability of said plurality of agents having skills appropriate to said determined service need.

9. A method of operating a communications management system, that is operational in a communication service providing system, for interconnecting a customer who is using a communication device, with a selected one of a plurality of agents who are connected to said communication service providing system, comprising the steps of:

providing said plurality of agents with access to at least one automated resource, that is operable to provide said plurality of agents with access to data to enable said selected one of said plurality of agents to serve said customer;

retrieving data relating to said customer to determine a service need of said customer;

selecting, in response to said determined service need, a one of said plurality of agents to serve said customer, comprising:

maintaining data comprising a mapping of agent experience and agent ability to use, on an unassisted and unsupervised basis, said at least one automated resource to data indicative of an augmented agent skill level for said plurality of agents, automatically selecting said one agent as a function of an experience level of said agent with respect to said service need and said agent's augmented skill level in using a one of said at least one automated resource appropriate for said service need; and establishing a communication connection through said communication service providing system to said selected one of said plurality of agents who is capable of serving said customer.

10. The method of operating a communications management system of claim 9 wherein said step of retrieving comprises:

interconnecting said customer with an interactive voice response system for presenting said customer with a predetermined hierarchically organized set of questions to obtain data from said customer for identifying said service need.

11. The method of operating a communications management system of claim 10 wherein said step of retrieving comprises:

automatically obtaining data relating to said customer for identifying said service need.

12. The method of operating a communications management system of claim 9 wherein said step of selecting comprises:

work flow based call routing using said identified service need to assist in the call navigation to said selected one of said plurality of agents.

13. The method of operating a communications management system of claim 12 wherein said step of rules based call routing comprises:

managing operation of said plurality of agents; and processing customer-specific data to adapt the operation of said communications management system to most effectively match the preferences of said customer.

14. The method of operating a communications management system of claim 10 wherein said step of selecting comprises:

maintaining data comprising a mapping of agent experience, agent ability to use said at least one automated resource, and a plurality of classes of service needs to data indicative of an augmented agent skill level.

15. The method of operating a communications management system of claim 9 wherein said step of selecting further comprises:

analyzing availability of said plurality of agents having skills appropriate to said determined service need.

* * * * *